United States Patent Office 2,998,419
Patented Aug. 29, 1961

---

2,998,419
CERTAIN AMINO, DICYANO PYRAZOLES AND PROCESS
Clifford Lee Dickinson, Jr., Wilmington, and William Joseph Middleton, Claymont, Del., assignors to E. I. du Pont de Nemours and Company, Wilmington, Del., a corporation of Delaware
No Drawing. Filed Oct. 30, 1959, Ser. No. 849,731
22 Claims. (Cl. 260—240)

This invention relates to new pyrazoles having an amino and two cyano groups on nuclear carbon and a process for their preparation.

This application is a continuation-in-part of our applications Serial No. 742,725, filed June 18, 1958 and Serial No. 815,315, filed May 25, 1959, both now abandoned.

Although many 5-membered heterocyclic ring systems having two heteroatoms occur in natural products, the pyrazole ring system, i.e., compounds having adjacent nitrogens, is a product of synthesis. Pyrazole itself has been obtained by reaction of acetylene with diazomethane. Certain substituted pyrazoles have been obtained by reaction of hydrazine with either a 1,3-dicarbonyl compound or an alpha, beta-unsaturated aldehyde, ketone or carboxylic acid.

We have now synthesized a new class of pyrazoles, namely, aminopyrazoles having two cyano groups on adjacent nuclear carbons. Embraced within our invention are compounds having hydrogen, hydrocarbon, substituted hydrocarbon, and acyl radicals replacing at least one hydrogen on the amino groups. These compounds or their immediate precursors are obtained by reacting tetracyanoethylene with a monosubstituted hydrazine, including aliphatic and aromatic hydrazines and acyl hydrazides, in substantially equimolar amounts. The hydrazine compound has the structure $RNHNH_2$ where R is an aliphatic or aromatic radical (including hydrocarbon and substituted hydrocarbon) or an acyl radical (including sulfonyl, carbamyl, and imido).

The reaction is rather surprising since it has heretofore been shown that tetracyanoethylene reacts with hydrazine (i.e., $H_2NNH_2$) in a 2 to 1 molar ratio to give an open chain product, namely, a 1,1,2,5,6,6-hexacyano-3,4-diazahexadiene (see Middleton U. S. Patent 2,836,606).

Our new pyrazoles can be represented by Formulas I and II:

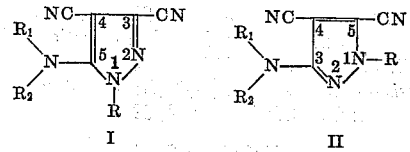

wherein R is hydrogen, hydrocarbyl (including alkyl and aryl), substituted hydrocarbyl or an acyl radical attached to nuclear nitrogen and $R_1$ and $R_2$ represent hydrogen, hydrocarbyl, substituted hydrocarbyl, and acyl radicals. R in the above formula has preferably up to 23 carbons and includes, in addition to hydrogen, aliphatic and aromatic radicals, including carbonyl and sulfonyl acyl radicals. The aliphatic and aromatic groups can optionally have present substituents such as halo, nitro, cyano, alkoxy, amino, sulfone, and sulfide. Preferably, $R_1$ in the above formula is hydrogen and $R_1$ and $R_2$ together have no more than 11 carbon atoms.

Although the compounds of this invention are generally represented by Formula I, isomeric compounds of Formula II are also obtainable, and in some instances are the major product of synthesis. That such isomers are capable of existence is not surprising in view of the literature on simple pyrazoles. Thus, Elderfield, "Heterocyclic Compounds," John Wiley, N. Y., 1957, vol. V, pages 91–92 shows similar isomers of a monosubstituted pyrazoles and indicates that a mixture of isomers may result in synthetic procedures producing pyrazoles. The compounds of Formula I are named as 5-amino-3,4-dicyanopyrazoles whereas those of Formula II are 3-amino-4,5-dicyanopyrazoles. Both of these are generically amino dicyanopyrazoles in which the cyano groups are on adjacent nuclear carbons. The existence and preparation of such isomers is shown by reference to specific Examples X, XI, XX, and XXI. The relative position of the double bonds and the nuclear nitrogen which is bonded to three different atoms are difficult to prove. For the purposes of this invention, the isomers have substantially the same utility.

In Formulas I and II, there can be one or more acyl substituents on amino nitrogen. By acyl is meant

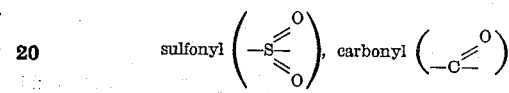

and related carbon acyls, including carbamyl, thioacyl, thiocarbonyl, guanyl, and imido groups. All of these are characterized by the fact that the atom of the acyl group attached to nitrogen (e.g., in the 1 position of the pyrazole) is also attached by double bond to nitrogen, oxygen, or sulfur.

Tetracyanoethylene as used in this invention can be prepared by the reaction of malononitrile with an equimolar quantity of sulfur monochloride, suitably in refluxing chloroform. The tetracyanoethylene formed can be recovered by evaporation of the chloroform solution and purified by sublimation.

The hydrazine compounds, that is, the other reactant in the preparation of our novel products or precursors thereof, include those that have only one substituent, i.e., have the formula $RNHNH_2$ wherein R is a monovalent radical. The hydrazine compounds are those which are stable and do not have groups present that react with tetracyanoethylene under the reaction conditions. Sidgwick, "The Organic Chemistry of Nitrogen," Clarendon Press, Oxford, 1937, on pp. 378-399 groups aryl, alkyl and acyl (including acyl of carbamic acid) derivatives of hydrazine together. The process of this invention therefore employs monosubstituted aliphatic, aromatic and acyl (of carboxylic, sulfonic, carbamic and similar acids) hydrazines having generally up to 23 carbons. Acyl hydrazines are referred to as hydrazides, including semicarbazides.

Since the new products of this invention or their precursors are formed by reaction of a hydrazine (including hydrazides and semicarbazides) with tetracyanoethylene in equimolar quantities, the two starting materials are preferably present in substantially equivalent amounts. Larger amounts of one of the reactants can be present but the molar ratio should be between 1:1.5 and 1.5:1 of the hydrazide to tetracyanoethylene.

The reaction generally takes place in liquid phase and an inert diluent or solvent is preferably employed, although added solvents are unnecessary if a liquid hydrazine compound is used. Suitable diluents or solvents are those that are nonreactive and from which the new pyrazoles can be readily separated by crystallization from the solvent or the diluent removed by vaporization. The amount of solvent is dependent upon the reactants. Suitable diluents or solvents are the lower alkanols, such sa methanol, ethanol, or butanol; ethers such as dioxane; water; esters, e.g., ethyl acetate; and amides such as dimethylformamide. In general, hydroxylated solvents or diluents are preferred.

The reaction makes no unusual requirements as to temperature and time. Temperatures of 0–100° C. can be used, but it is preferred the temperature be kept below 50° C. The time is dependent upon the temperature and times of from a few minutes to several hours are generally employed.

The pyrazoles thus obtained are removed from the diluent by filtration from or evaporation of the solvent.

Further purification, when necessary, can be effected through conventional crystallization techniques.

The pyrazoles of our invention are crystalline compounds that are generally white to pale yellow in color. In general, upon heating at or above 200° C., they undergo transformation to a polymeric material that is more inert and stable to higher temperatures.

By virtue of their two cyano groups, the pyrazoles of the invention are hydrolyzed to dicarboxylic acids. For example, 5-amino-3,4-dicyanopyrazole and 5-amino-3,4-dicyano-1-phenylpyrazole have been hydrolyzed by refluxing 10% aqueous sodium hydroxide to 5-amino-3,4-dicarboxylpyrazole and 5-amino-3,4-dicarboxyl-1-phenylpyrazole. Such dicarboxylic acids can be used to form condensation polymers, e.g., with molar amounts of dihydric alcohols or diprimary diamines.

The dicyanopyrazoles of this invention can be reduced with lithium aluminum hydride to convert the cyano groups to aminomethyl groups, e.g., giving diamines of the structure

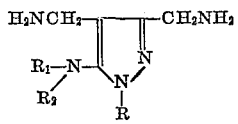

These compounds are also obtainable by catalytic reduction, e.g., with a cobalt-on-kieselguhr catalyst at 100–150° C. and at 2000–3000 lb./sq. in. pressure of hydrogen. The polyamines of the above structure are useful for the preparation of polyamides. Reaction with equimolar amounts of a dibasic acid such as adipic acid, suitably at elevated temperatures such as about 200° C. gives a polyamide which has unusual affinity for dyes by virtue of the presence of the substituted pyrazole ring in the chain. These polyamines are also useful as inhibitors, e.g., in rubber, by incorporation of about 0.05% by weight of the amine.

The new compounds of this invention or their derivatives have an affinity for proteinaceous material. This is further illustrated by the attachmeent of aldehyde derivatives of the 5-amino-3,4-dicyanopyrazoles to wool to give a dyed product as shown in Examples VII and VIII.

The following examples further illustrate the preparation of new pyrazoles of this invention.

EXAMPLE I 5-amino-1-carbamyl-3,4-dicyanopyrazole

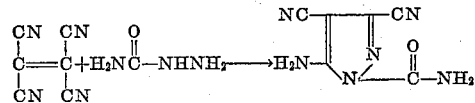

To a solution of 13.6 g. (0.1 mole) of sodium acetate trihydrate and 11.2 g. (0.1 mole) of semicarbazide hydrochloride in 200 ml. of water there was added 12.8 g. (0.1 mole) of tetracyanoethylene. The mixture was stirred overnight and the white solid that formed was collected. The yield was 17.1 g. The compound started to melt at 262° C. but formed an orange solid before it could be melted. A sample was recrystallized from dioxane for analysis.

Analysis.—Calc'd for $C_6H_4ON_6$: C, 40.91; H, 2.27; N, 47.73. Found: C, 41.62–41.38; H, 2.41–2.37; N, 47.35–47.38.

EXAMPLE II 5-amino-1-benzoyl-3,4-dicyanopyrazole

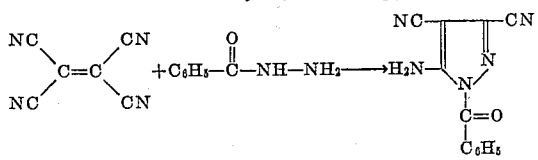

A mixture of 3.84 g. (0.03 mole) of tetracyanoethylene, 4.02 g. (0.03 mole) of benzhydrazide and 50 ml. of water was stirred overnight. The pale yellow precipitate was collected by filtration to yield 4.68 t. (68%). The melting point was above 200° C., but the compound failed to give a sharp melting point even after several recrystallizations from acetic acid.

Analysis.—Calc'd for $C_{12}H_7ON_5$: C, 60.76; H, 2.95; N, 29.53. Found: C, 62.17; H, 3.28; N, 29.45.

EXAMPLE III 5-amino-3,4-dicyano-1-p-toluenesulfonylpyrazole

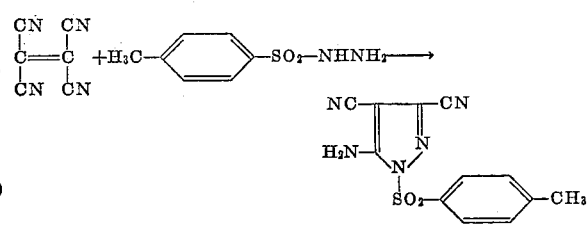

To a solution of 18.6 g. of p-toluenesulfonylhydrazide in 200 ml. of ethanol cooled in ice was added 12.8 g. of tetracyanoethylene. This was stirred for one hour, then heated under reflux for fifteen minutes. The mixture was then cooled, and the precipitate was collected and washed with 95% ethyl alcohol. The yield was 25 g., M.P. 211–213° C.

Analysis.—Calc'd for $C_{12}H_9N_5SO_2$: C, 50.2; H, 3.1; N, 24.4; S, 11. 2. Found: C, 50.4; H, 3.3; N, 24.4; S, 11.2.

EXAMPLE IV 1-acetyl-5-amino-3,4-dicyanopyrazole

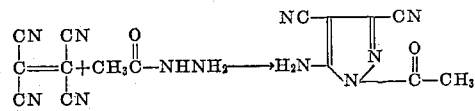

A mixture of 12.8 g. tetracyanoethylene, 7.4 g. of acetylhydrazide, and 100 ml. of water was stirred at room temperature for three hours and then filtered. The solid that was collected was recrystallized from acetic acid to give 12.0 g., M.P. 195–1980 C. (with dec.).

Analysis.—Calc'd for $C_7H_5N_5O$: C, 48.0; H, 2.9; N, 40.0. Found: C, 48.0; H, 3.1; N, 39.3.

EXAMPLE V 5-acetamido-3,4-dicyanopyrazole

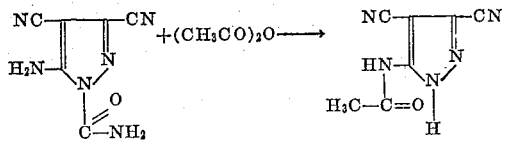

A mixture of 10 g. of 5-amino-1-carbamyl-3,4-dicyanopyrazole, 40 ml. of acetic anhydride, and 5 ml. of pyridine was heated on a hot plate until a solution was obtained. This solution was poured into 400 ml. of ice water, and the solid product was collected and recrystallized from ethanol to yield 6.00 g., M.P. 269–271° C. (with dec.).

Analysis.—Calc'd for $C_7H_5N_5O$: C, 48.0; H, 2.9; N, 40.0. Found: C, 48.0; H, 3.1; N, 38.8.

EXAMPLE VI

*5-amino-3,4-dicyanopyrazole*

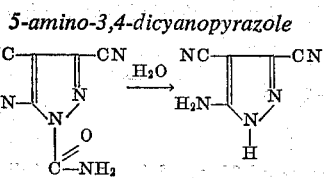

A mixture of 1.0 g. of 5-amino-1-carbamyl-3,4-dicyanopyrazole and 25 ml. of water was heated under reflux for six hours. After the mixture was cooled and filtered, there was obtained 0.4 g., M.P. 250° C. (with dec.). This was purified by recrystallization from water.

*Analysis.*—Calc'd. for $C_5H_3N_5$: C, 45.1; H, 2.3; N, 52.6. Found: C, 45.7; H, 2.1; N, 52.3.

Treatment of 5 g. of 5-amino-3.4-dicyanopyrazole in 50 ml. of tetrahydrofuran with 5.3 ml. of isocyanic acid at room temperature for 3 days gave a white precipitate. The latter was removed by filtration and recrystallized from dioxane. There was obtained 5-amino-1-carbamyl-3,4-dicyanopyrazole (the product of Example I).

EXAMPLE VII

*5-(p-dimethylaminobenzal)-amino-1-carbamyl-3,4-dicyanopyrazole*

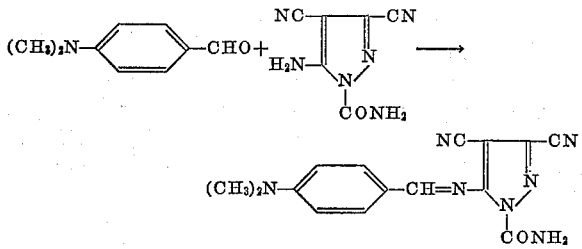

A solution of 1.0 g. of 5-amino-1-carbamyl-3,4-dicyanopyrazole and 0.85 g. of p-dimethylaminobenzaldehyde in 9 ml. of dimethylformamide was heated momentarily to boiling and then allowed to stand for three days. It was diluted with 40 ml. of water and the bright yellow precipitate was collected to yield 0.32 g., M.P. 120–125° C.

To a solution of 0.02 g. of "Marasperse CB" (a partially desulfonated sodium lignin sulfonate dispersing agent) in 50 ml. of water was added 5 ml. of sodium bicarbonate solution and a solution of 0.02 g. of the above p-dimethylaminobenzaldehyde derivative in 1.0 ml. of dimethylformamide. There was then added 0.1 g. swatches of acetate, nylon, and wool fabrics and this mixture was heated on the steam bath for fifteen minutes. The fabrics were dyed yellow.

EXAMPLE VIII

*5-amino-3,4-dicyano-1-phenylpyrazole*

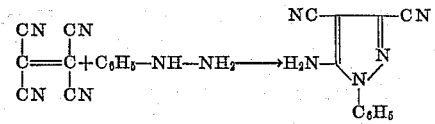

Tetracyanoethylene (6.4 g., 0.05 mole) was added in small portions to a solution of 5.4 g. (0.05 mole) of phenylhydrazine in 50 ml. of ethanol cooled in an ice bath. The container was allowed to warm at room temperature and the solid was collected on a filter and washed with ethanol. The yield was 6.1 g. (58%). The white solid appeared to melt at 193° C., but immediately became cloudy and an orange solid appeared. A sample was recrystallized from ethanol for analysis.

*Analysis.*—Calc'd. for $C_{11}H_7N_5$: C, 63.16; H, 3.35; N, 33.49. Found: C, 63.44, 63.19; H, 3.49, 3.40; N, 31.81, 31.79.

A mixture of 1.09 g. of 5-amino-3,4-dicyano-1-phenylpyrazole, 0.75 g. of p-dimethylaminobenzaldehyde and 0.1 g. of p-toluenesulfonic acid in 2 ml. of dimethylformamide was heated on a steam bath for an hour, cooled and diluted with 10 ml. of ethanol, whereupon 1.07 g. of product, M.P. 190–195°, resulting from the condensation was obtained. This product was used as a dye as follows: 0.02 g. of it was dissolved in 0.5 ml. of dimethylformamide and the solution poured into 70 ml. of boiling water containing 0.02 g. of "Marasperse CB" (a partially desulfonated sodium lignin sulfonate dispersing agent) and a drop of acetic acid. Fabrics (0.1 g. pieces) of wool, acetate rayon, nylon and polyethylene terephthalate were dyed a bright yellow color.

EXAMPLE IX

*5-amino-3,4-dicyano-1-p-nitrophenylpyrazole*

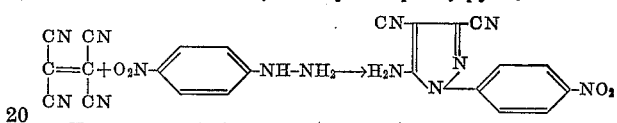

Tetracyanoethylene (2.56 g., 0.02 mole) was added in small portions with stirring to a cooled mixture of 2.06 g. (0.02 mole) of p-nitrophenylhydrazine and 50 ml. of ethanol. After most of the tetracyanoethylene had been added, the mixture became thick and 25 ml. of ethanol was added to increase the mobility. The precipitate was collected. The yield was 4.15 g. (82%), M.P. 247–250° C. After recrystallization from ethanol the melting point was 252–253° C.

*Analysis.*—Calc'd. for $C_{11}H_6N_4O_2$: C, 51.97; H, 2.36; N, 33.07. Found: C, 52.07; H, 2.55; N, 32.10.

EXAMPLE X

*5-amino-3,4-dicyano-1-methylpyrazole or 3-amino-4,5-dicyano-1-methylpyrazole*

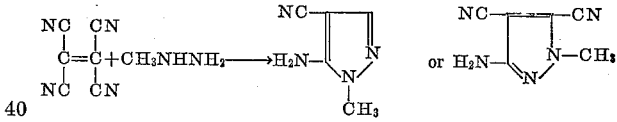

To a stirred mixture of 6.24 g. (0.05 mole) of tetracyanoethylene and 50 ml. of water was added a solution of 2.30 g. (0.05 mole) of methylhydrazine in 15 ml. of water dropwise. After 4 hours the dark brown precipitate was collected and recrystallized from water (with purification by use of decolorizing charcoal) to yield 1.80 g. (25%) of an aminodicyano-1-methylpyrazole, M.P. 130–133° C. A sample was resublimed for analysis, M.P. 131.5–133° C.

*Analysis.*—Calc'd. for $C_6H_5N_5$: C, 48.98; H, 3.40; N, 47.62. Found: C, 49.15; H, 3.40; N, 46.24.

EXAMPLE XI

*5-amino-3,4-dicyano-1-methylpyrazole and 3-amino-4,5-dicyano-1-methylpyrazole*

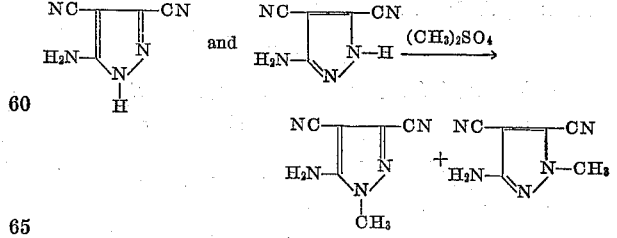

A mixture of 11.5 g. of sodium hydroxide, 33.3 g. of 5-amino-3,4-dicyanopyrazole (obtained by the general procedure of Example VI) and 42 g. of dimethyl sulfate was stirred for 15 minutes. The solid which was obtained was collected on a filter. Recrystallization from dioxane gave 22.5 g. of an aminodicyano-1-methylpyrazole, M.P. 240–245° C.

*Analysis.*—Calc'd. for $C_6H_5N_5$: C, 49.0; H, 3.4; N, 47.6. Found: C, 49.2; H, 3.6; N, 47.3.

From the filtrate, there was deposited 5.5 g. of a further solid which melted at 110–120° C. Several recrystallizations from ethanol gave an aminodicyano-1-methylpyrazole melting at 128–130° C. A mixed melting point with the aminodicyano-1-methylpyrazole of Example X showed no depression.

EXAMPLE XII

*5-amino-3,4-dicyano-1-phenylcarbamylpyrazole*

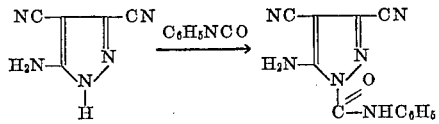

A solution of 1.33 g. of 5-amino-3,4-dicyanopyrazole (see Example VI) and 1.20 g. of phenylisocyanate in 20 ml. of tetrahydrofuran was allowed to stand for ten days. The 5 - amino-3,4-dicyano-1-phenylcarbamylpyrazole was obtained by evaporating the tetrahydrofuran to dryness. It was recrystallized from ethyl acetate, M.P. 223–224° C.

*Analysis.*—Calc'd. for $C_{12}H_8N_6O$: C, 57.2; H, 3.2; N, 33.4. Found: C, 57.4; H, 3.4; N, 33.5.

EXAMPLE XIII

*5-amino-3,4-dicyano-1-N,N-dimethylcarbamylpyrazole*

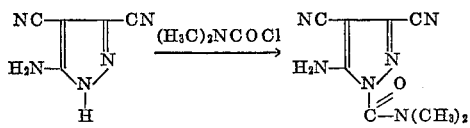

A solution of 13.3 g. of 5-amino-3,4-dicyanopyrazole (see Example VI), 10.7 g. of dimethylcarbamyl chloride, and 10.1 g. of triethylamine in 120 ml. of tetrahydrofuran was allowed to stand overnight and then filtered. The solid was collected and washed with water, and the filtrate was evaporated to dryness and washed with water. The combined weight of solid was 14.1 g. and this was recrystallized from dioxane to give 5-amino-3,4-dicyano-1-N,N-dimethylcarbamylpyrazole, M.P. 227–228° C.

*Analysis.*—Calc'd. for $C_8H_8N_6O$: C, 47.1; H, 3.9; N, 41.2. Found: C, 47.1; H, 4.0; N, 40.6.

EXAMPLE XIV

*5-amino-3,4-dicyano-1-N,N-diethylcarbamylpyrazole*

The general procedure of Example XIII was repeated except that an equivalent amount on a molar basis of diethylcarbamyl chloride was used in place of the dimethyl derivative. The 5-amino-3,4-dicyano-1-N,N-diethylcarbamylpyrazole obtained was recrystallized from ethanol, M.P. 170–173° C.

*Analysis.*—Calc'd. for $C_{10}H_{12}N_6O$: C, 51.7; H, 5.2. Found: C, 52.0; H, 5.1.

EXAMPLE XV

*5-amino-3,4-dicyano-1-carbethoxypyrazole*

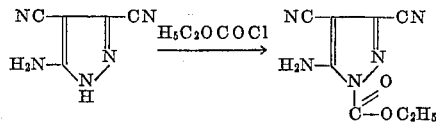

A solution of 13.3 g. of 5-amino-3,4-dicyanopyrazole (see Example VI), 10.8 g. of ethyl chlorocarbonate, and 10.1 g. of triethylamine in 200 ml. of tetrahydrofuran was allowed to stand overnight. It was then filtered and the filtrate was evaporated to dryness to give 18.5 g. of 5-amino-3,4-dicyano-1-carbethoxypyrazole. This was recrystallized from ethyl acetate, M.P. 207–8° C.

*Analysis.*—Calc'd. for $C_8H_7N_5O_2$: C, 47.3; H, 3.4; N, 34.1. Found: C, 47.5; H, 3.6; N, 34.5.

EXAMPLE XVI

*5-amino-3,4-dicyano-N-ethyl-1-pyrazolecarboxamide*

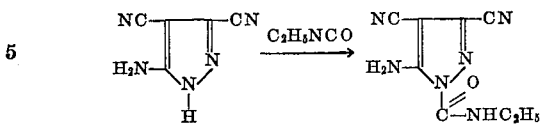

To a mixture of 30 g. of 5-amino-3,4-dicyanopyrazole (see Example VI) and 265 g. of dry tetrahydrofuran, contained in a round-bottomed flask fitted with a stirrer, reflux condenser, and drying tube, was added 17.6 g. of ethyl isocyanate. The mixture was stirred and heated at reflux for 7 hours. It was then cooled in ice and the 5-amino-3,4-dicyano-N-ethyl-1-pyrazolecarboxamide was filtered off as white leaflets (22.5 g.), M.P. 233–235° C. dec. After recrystallization from tetrahydrofuran, the melting point was 234–235° C. dec. The infrared spectrum showed typical absorption bands for CN, C=O, and N—H groups.

*Analysis.*—Calc'd. for $C_8H_8OH_6$: C, 47.00; H, 3.95; N, 41.15. Found: C, 47.17; H, 4.12; N, 40.92.

EXAMPLE XVII

*5-amino-3,4-dicyano-1-(N,N-dimethylsulfamyl)pyrazole*

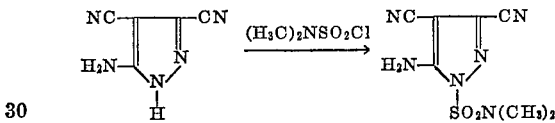

A stirred solution of 20 g. (0.15 m.) of 5-amino-3,4-dicyanopyrazole (see Example VI) and 15 g. (0.15 m.) of triethylamine in tetrahydrofuran (100 ml.) was treated portionwise under dry conditions at room temperature (25–27°) with 21.5 g. (0.55 m.) of N,N-dimethylsulfamyl chloride. After standing at room temperature for 15 hours, the reaction mixture was heated on the steam bath for one hour. After concentrating to a volume of 50 ml. and diluting with water, the resulting pale yellow precipitate was filtered and washed thoroughly with water. This crude air-dried product amounting to 28 g. (78% yield) was crystallized from boiling ethanol to give white prisms, M.P. 163–7° C. (Fischer block). The 5-amino-3,4-dicyano-1-(N,N-dimethylsulfamyl)pyrazole is soluble in tetrahydrofuran, insoluble in ether, benzene, and water.

*Analysis.*—Calc'd. for $C_7H_8N_6O_2S$: N, 35.00; S, 13.33. Found: N, 35.33; S, 12.94.

EXAMPLE XVIII

*1-allophanoyl-5-amino-3,4-dicyanopyrazole*

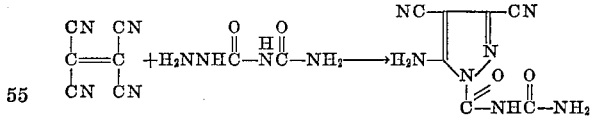

To a solution of 11.8 g. of amino biuret in 50 cc. acetic acid and 100 cc. water, at room temperature, was added 12.8 g. of tetracyanoethylene in small portions. A dark yellow precipitate began to form immediately which became lighter in color after one and one-half hours of stirring at room temperature. Filtration and washing with water was followed by air-drying overnight. The 1-allophanoyl-5-amino - 3,4 - dicyanopyrazole melted over 300° C.

*Analysis.*—Calc'd. for $C_7H_5N_7O_2$: C, 38.36; H, 2.30. Found: C, 38.33; H, 2.54.

EXAMPLE XIX

*5-amino-3,4-dicyano-1-guanylpyrazole*

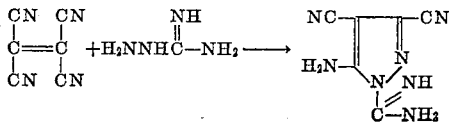

To a solution of 13.6 g. of sodium acetate trihydrate (0.1 mole) and 12.3 g. of aminoguanidine sulfate (0.1 mole) in 200 cc. water and 6 g. of acetic acid (0.1 mole) was added 12.8 (0.1 mole) of tetracyanoethylene. During the addition of the tetracyanoethylene, an additional 55 cc. of water was added. The reaction mixture was stirred overnight at room temperature. Filtration and washing with water gave a light gray precipitate which was air-dried. Crystallization of this precipitate from pyridine gave 5-amino-3,4-dicyano-5-guanylpyrazole as a light yellow powder, M.P. 179° C.

*Analysis.*—Calc'd. for $C_6H_5N_7$: C, 41.14; H, 2.88; N, 55.98. Found: C, 40.99; H, 3.21; N, 54.57.

EXAMPLE XX

*5-amino-3,4-dicyano-1-sulfamylpyrazole and/or 3-amino-4,5-dicyano-1-sulfamylpyrazole*

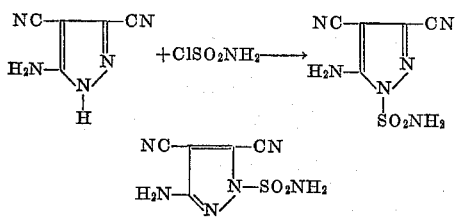

To a solution of 13.3 g. (0.1 mole) of 5-amino-3,4-dicyanopyrazole (see Example VI) and 10.2 g. (0.1 mole) triethylamine and 133 cc. tetrahydrofuran was added a solution of 11.5 g. (0.1 mole) sulfamic acid chloride in 25 cc. tetrahydrofuran. The temperature was maintained at 0–5° C. during the addition. After the addition, the reaction mixture was stirred in an ice bath for three-quarters of an hour and then allowed to warm to room temperature. The solvent was removed under reduced pressure at 30–40° C. and the residue was taken up in 400 cc. of cold 2% acetic acid. A clear solution resulted. Extraction with ethyl acetate several times followed by drying and evaporation of the ethyl acetate gave 15.0 g. of a white solid, M.P. 187–193° C.

EXAMPLE XXI

*3-amino-4,5-dicyano-1-phenylcarbamylpyrazole*

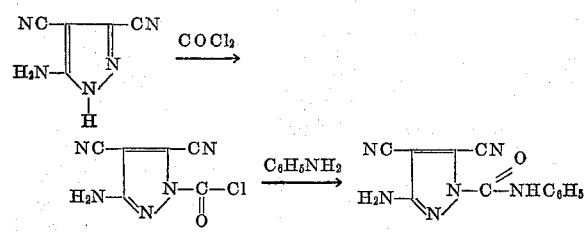

To a solution of 400 g. of phosgene (4 moles) in 500 cc. tetrahydrofuran was added a solution of 133 g. (1 mole) of 5-amino-3,4-dicyanopyrazole and 102 g. (1 mole) triethylamine in 1 l. tetrahydrofuran. The temperature was maintained at 0–10° C. during the addition. An additional 500 cc. of tetrahydrofuran was added after one-fourth of the dropwise addition had been completed. The reaction mixture was allowed to stand overnight as it warmed from +5° C. to room temperature. Filtration and washing of the precipitate with tetrahydrofuran gave 124.3 g. of dry solid (theory for triethylamine hydrochloride=137.5 g). The filtrate containing the 3-amino-4,5-dicyanopyrazole-1-carboxylic acid chloride was evaporated under reduced pressure to a volume of 545 cc. and stored under $N_2$ near 0° C.

To a solution of 10 g. of aniline and 11 g. of triethylamine in 300 cc. of tetrahydrofuran was added dropwise a solution containing approximately one-tenth mole of 3-amino-4,5-dicyanopyrazole-1-carboxylic acid chloride. The reaction mixture was kept near 0° C. for 12 hours. The solvent was removed under reduced pressure at 25–35° C. and 200 cc. of ice cold 10% acetic acid was added to the residue. Additional tetrahydrofuran was added to induce the cloudy precipitate to crystallize. Filtration and air-drying gave 8.26 g. of a crude material, M.P. over 300° C., which had an infrared spectrum almost identical with that obtained for the lower melting 5-amino-3,4-dicyanopyrazole-1-carboxanilide made from 5-amino-3,4-dicyanopyrazole and phenyl isocyanate.

*Analysis.*—Calc'd. for $C_{12}H_8N_6$: C, 57.14; H, 3.20. Found: C, 58.32; H, 3.85.

EXAMPLE XXII

*5-amino-3,4dicyano-1-(N-carbethoxymethyl)carbamylpyrazole*

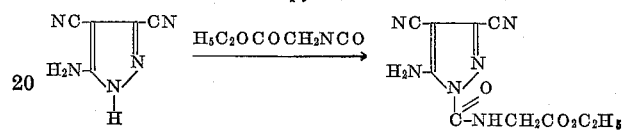

A solution of 26.2 g. of carbethoxymethyl isocyanate in 25 ml. of tetrahydrofuran was added dropwise during 0.25 hour to a stirred suspension of 13.3 g. of 5-amino-3,4-dicyanopyrazole in 125 ml. of tetrahydrofuran. The mixture was stirred for 0.25 hour at room temperature, heated for one hour at reflux, and then evaporated to dryness on a steam bath. The solid residue was recrystallized from a mixture of equal volumes of benzene and tetrahydrofuran to obtain as a first crop 11.5 g. of 5-amino-3,4-dicyano-1 - (N-carbethoxymethyl)carbamylpyrazole melting at 200.4–201° C. By filtration of the partially evaporated filtrate from the first crop, a second crop was obtained that weighed 5.7 g. and melted at 199.6–200.6° C.

*Analysis.*—Calc'd. for $C_{10}H_{10}N_6O_3$: C, 45.80%; H, 3.84%; N, 32.05%. Found: C, 45.73%; H, 3.78%; N, 32.16%.

When the general procedure of Example II is repeated except that the hydrazide employed is 2-naphthhydrazide, 5,8-dichloro-2-naphthhydrazide, 1,4 - diphenyl-2-naphthhydrazide, p-nitrophenyl acethydrozide, 3,4,5-trimethoxybenzhydrazide, β-methylsulfonyl propionhydrazide, β-methylmercaptopropionhydrazide, omega - cyanopelargonhydrazide, or beta-indole-alpha-aminopropionhydrazide, there are obtained the following pyrazoles:

5-amino-1-(2-naphthoyl)-3,4-dicyanopyrazole,
5-amino-1-(5,8-dichloro - 2 - naphthoyl) - 3,4-dicyanopyrazole,
5-amino-1-(1,4 - diphenyl - 2 - naphthoyl) - 3,4-dicyanopyrazole,
5-amino-1-p-nitrophenylacetyl-3,4-dicyanopyrazole,
5-amino-1-(3,4,5-trimethoxybenzoyl) - 3,4 - dicyanopyrazole,
5-amino-1 - beta-methylsulfonylpropionyl - 3,4 - dicyanopyrazole,
5-amino - 1 - beta-methylmercaptopropionyl-3,4-dicyanopyrazole,
5-amino-1-omega - cyanopelargonoyl-3,4-dicyanopyrazole, and
5-amino-1-(beta - indole - alpha - aminopropionyl)-3,4-dicyanopyrazole, respectively.

When the general procedure of Example I is repeated except that the semicarbazide employed is 4-p-nitrophenylsemicarbazide, 4-(3-camphoryl)semicarbazide, 4-n-butyl-4-stearylsemicarbazide (obtained by reaction of hydrazine with N-n-butyl-N-stearyl carbamyl chloride which in turn results from the reaction of N-n-butyl-N-stearylamine and phosgene), 4-diethyleneoxysemicarbazide (from the reaction of hydrazine with the product obtained by molar condensation of phosgene and morpholine), carbohydrazide, and the ethyl ester of hydrazine carboxylic acid whereby there are obtained the following:

5-amino-3,4-dicyanopyrazyl-1-p-nitrocarbanilide,
5-amino-3,4-dicyanopyrazyl-1-(3)-camphoramide,
5-amino - 3,4 - dicyanopyrazyl - 1 - N-n-butyl-N-stearylcarbamide,
5-amino-3,4-dicyanopyrazyl-1-carbomorpholine,
5-amino-3,4-dicyanopyrazyl-1-carbohydrazide, and ethyl-5-amino-3,4-dicyanopyrazyl-1-carboxylate, respectively.

When the general procedure of Example III is repeated except that 2-naphthalenesulfonylhydrazide is employed, there is likewise obtained 5-amino-1-(2-naphthylsulfonyl)-3,4-dicyanopyrazole.

When the general procedure of Example VIII is repeated except that the hydrazine is m-nitrophenylhydrazine, p-chlorophenylhydrazine and alpha-naphthylhydrazine, there are obtained 5-amino-3,4-dicyano-1-m-nitrophenylpyrazole, 5-amino-3,4-dicyano-1-p-chlorophenylpyrazole, and 5-amino-3,4-dicyano-1-alpha-naphthylpyrazole.

Aminodicyanopyrazoles having a

thioacyl, group attached to nuclear nitrogen are readily available. Thus when 5-amino-3,4-dicyano-1-guanylpyrazole is reacted with hydrogen sulfide, there results 5-amino-3,4-dicyano-1-thiocarbamylpyrazole.

Particularly preferred are the carbamyl derivatives of the nuclear nitrogen (1-position) in view of the ease of preparation and reactivity of such pyrazoles, e.g., for use in the further preparation of new pyrazoles.

The pyrazole as obtained in Examples I–IV and related compounds as described above have a free primary amino group in the 5-position of the ring. Either or both of the hydrogens of this amino group are replaced by reaction of the pyrazole with an acylating or alkylating agent, including condensation with carbonyl compounds, particularly aromatic aldehydes. Thus, when 5-amino-3,4-dicyano-1-p-toluenesulfonylpyrazole is reacted with molar amounts of p-toluenesulfonyl chloride in an inert liquid diluent at a temperature of 50–100° C., there is obtained 3,4-dicyano-5-p-toluenesulfonylamino-1-p-toluenesulfonylpyrazole. The latter compound is also obtained by the reaction of p-toluenesulfonyl chloride (in double the quantities on a molar basis) with 5-amino-3,4-dicyanopyrazole—the product of Example VI. The same general methods can be employed to give 3,4-dicyanopyrazole having naphthalenesulfonyl on both the 1-position and the 5-amino group.

A hydrogen of the 5-amino group can likewise be replaced by an acetyl group (e.g., from acetic anhydride or acetyl chloride), benzoyl or naphthoyl groups (e.g., from benzoyl or naphthoyl chlorides), carbamyl from the reaction of carbamyl chloride, thiocarbamyl from thiocarbamyl chloride or thioacetyl from thioacetyl chloride on a 5-amino-3,4-dicyanopyrazole, or a p-acetamidobenzenesulfonyl (from p-acetamidobenzenesulfonyl chloride).

Reaction of 5-amino-3,4-dicyanopyrazoles with aldehydes such as butyraldehyde, cyclohexanone, benzaldehyde and naphthaldehyde give the corresponding condensation products of the Schiff's base type, i.e., where the 5-amino hydrogens are replaced by a $R_4CH=$ group wherein $R_4$ is an aliphatic, cycloaliphatic, or aromatic group, preferably a hydrocarbyl group. These compounds are generally colored and can be employed as dyes. These aldehyde condensation compounds can be reduced, e.g., by hydrogen in ethanol with a platinum catalyst to give the corresponding secondary amine, i.e., compounds of Formula I where $R_1$ is hydrogen and $R_2$ is an aliphatic, cycloaliphatic or aromatic radical.

As many apparently widely different embodiments of this invention may be made without departing from the spirit and scope thereof, it is to be understood that the invention is not limited to the specific embodiments thereof except as defined in the appended claims.

The embodiments of the invention in which an exclusive property or privilege is claimed are defined as follows:

1. 5-amino-1-carbamyl-3,4-dicyanopyrazole.
2. 5-amino-1-benzoyl-3,4-dicyanopyrazole.
3. 5-amino-3,4-dicyano-1-p-toluenesulfonylpyrazole.
4. 5-amino-3,4-dicyano-1-phenylpyrazole.
5. 5-amino-3,4-dicyanopyrazole.
6. 5-(p-dimethylaminobenzal)amino-1-carbamyl-3,4-dicyanopyrazole.
7. 3-amino-4,5-dicyano-1-phenylcarbamylpyrazole.
8. 1-allophanoyl-5-amino-3,4-dicyanopyrazole.
9. 1-acetyl-5-amino-3,4-dicyanopyrazole.
10. 5-acetamido-3,4-dicyanopyrazole.
11. 5-amino-3,4-dicyano-1-p-nitrophenylpyrazole.
12. 5-amino-3,4-dicyano-1-N,N-dimethylcarbamylpyrazole.
13. 5 - amino-3,4-dicyano-1-N,N-diethylcarbamylpyrazole.
14. 5-amino-3,4-dicyano-1-carbethoxypyrazole.
15. 5-amino - 3,4 - dicyano-N-ethyl-1-pyrazolecarboxamide.
16. 5-amino - 3,4 - dicyano-1-(N,N-dimethylsulfamyl)pyrazole.
17. 5-amino-3,4-dicyano-1-guanylpyrazole.
18. 5 - amino-3,4-dicyano-1-(N-carbethoxymethyl)carbamylpyrazole.
19. A compound selected from the class consisting of those of the formula

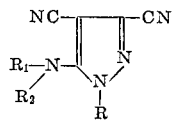

and those of the formula

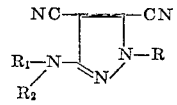

wherein R is a member of the class consisting of hydrogen, lower alkyl, lower alkanoyl, hydrocarbon aryl of not more than 10 carbons, carbamyl, N-lower alkylcarbamyl, N-arylcarbamyl, where said aryl group is of not more than 10 carbons, N,N-dialkylcarbamyl where said alkyl group is of not more than 18 carbons, hydrocarbon aroyl of not more than 11 carbons, lower alkoxyphenyl, lower alkoxycarbonyl, hydrocarbon arylsulfonyl of not more than 10 carbons, sulfamyl, N,N-di(lower alkyl)sulfamyl, allophanyl, guanyl, thiocarbamyl, N-carb-(lower)alkoxymethylcarbamyl and monosubstituted derivatives of said hydrocarbon aryl, said hydrocarbon aroyl and said hydrocarbon arylsulfonyl, where said substituents are selected from the group consisting of nitro and chloro, and $R_1$ and $R_2$ together have not more than 11 carbons and taken separately are selected from the class consisting of hydrogen, hydrocarbon free of aliphatic unsaturation, lower alkanoyl and aryl sulfonyl, and taken together are hydrocarbon-ylidene.

20. Process for preparing a compound selected from the class consisting of those of the formula

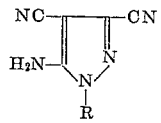

and those of the formula

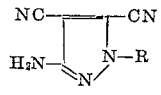

wherein R is a member of the class consisting of hydrogen, lower alkyl, lower alkanoyl, hydrocarbon aryl of not more than 10 carbons, carbamyl, N-lower alkylcarbamyl, N-arylcarbamyl where said aryl group is of not more than 10 carbons, N,N-dialkylcarbamyl where said alkyl group is of not more than 18 carbons, hydrocarbon aroyl of not more than 11 carbons, lower alkoxyphenyl, lower alkoxycarbonyl, hydrocarbon arylsulfonyl of not more than 10 carbons, sulfamyl, N,N-di(lower alkyl)sulfamyl, allophanyl, guanyl, thiocarbamyl, N-carb(lower)alkoxymethylcarbamyl and monosubstituted derivatives of said hydrocarbon aryl, said hydrocarbon aroyl and said hydrocarbon arylsulfonyl, where said substituents are selected from the group consisting of nitro and chloro, which comprises reacting in substantially equimolar amount, in a liquid phase, tetra cyanoethylene with a hydrazino compound of the formula $RNHNH_2$, wherein R is as defined above.

21. Process of claim 20 wherein the reaction is carried out in a hydroxylated solvent.

22. Process of claim 20 wherein the reaction is carried out at a temperature within the range of from 0° to 100° C.

References Cited in the file of this patent

UNITED STATES PATENTS 2,912,437     Schutt et al. _____ Nov. 10, 1959

FOREIGN PATENTS 798,662     Great Britain _____ July 23, 1958